US007092138B2

(12) United States Patent
Wang et al.

(10) Patent No.: US 7,092,138 B2
(45) Date of Patent: Aug. 15, 2006

(54) ELASTOMER SPATIAL LIGHT MODULATORS FOR EXTREME ULTRAVIOLET LITHOGRAPHY

(75) Inventors: Jen-Shiang Wang, Stanford, CA (US); Il Woong Jung, Stanford, CA (US); Olav Solgaard, Stanford, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 23 days.

(21) Appl. No.: 10/962,055

(22) Filed: Oct. 8, 2004

(65) Prior Publication Data

US 2005/0146768 A1    Jul. 7, 2005

Related U.S. Application Data

(60) Provisional application No. 60/510,485, filed on Oct. 10, 2003.

(51) Int. Cl.
*G02F 1/03* (2006.01)
(52) U.S. Cl. .................................................. 359/245
(58) Field of Classification Search ................ 359/53, 359/67, 68, 69, 70, 71, 245, 248, 254; 430/5, 430/20, 22, 33
See application file for complete search history.

(56) References Cited

U.S. PATENT DOCUMENTS

| 4,494,826 A | 1/1985 | Smith | 359/294 |
|---|---|---|---|
| 4,529,620 A | 7/1985 | Glenn | 438/29 |
| 4,566,935 A | 1/1986 | Hornbeck | 438/29 |
| 5,311,360 A | 5/1994 | Bloom et al. | 359/572 |
| 5,867,301 A | 2/1999 | Engle | 359/291 |
| 5,870,176 A | 2/1999 | Sweatt et al. | 355/53 |
| 6,060,224 A | 5/2000 | Sweatt et al. | 430/395 |
| 6,356,340 B1 | 3/2002 | Spence | 355/53 |
| 6,544,698 B1 | 4/2003 | Fries | 430/22 |

OTHER PUBLICATIONS

C. W. Gwyn et al. "Extreme Ultraviolet Lithography," J. Vac. Sci. Technol. B 16, pp. 3142-3149 (1998).
N. Choksi et al. "Maskless Extreme Ultraviolet Lithography," J. Vac. Sci. Technol. B 17, pp. 3047-3051 (1999).
Y. Shroff et al. "Fabrication of Parallel-Plate Nanomirror Arrays For Extreme Ultraviolet Maskless Lithography," J. Vac. Sci. Technol. B 19, pp. 2412-2415 (2001).

(Continued)

*Primary Examiner*—Hung Xuan Dang
*Assistant Examiner*—Tuyen Tra
(74) *Attorney, Agent, or Firm*—Lumen Intellectual Property Services, Inc

(57) ABSTRACT

A new design and fabrication process of an elastomer spatial light modulator (eSLM). The present invention resolves many known challenges and enables the eSLM to operate as programmable masks for the EUV lithography systems. Bottom electrodes are deposited and patterned on an insulation layer. A sacrificial layer is then deposited, patterned and polished on top of the bottom electrodes. A nitride shell forms a protection layer that prevents out-gassing and degradations of elastomer during operations. The sacrificial layer is removed, forming a cavity. An elastomer is injected at one end of the cavity and pulled into it by capillary forces. In an embodiment, the eSLM comprises a 2-D array of elastomer pillars, each containing a capacitive actuator with an elastomer as the supporting and dielectric structure. A stack of Mo/Si multilayer mirror is deposited on the surface to achieve a high reflectivity about 70% or more in EUV.

22 Claims, 6 Drawing Sheets

OTHER PUBLICATIONS

O. Solgaard et al. "Deformable Grating Optical Modulator," Opt. Lett. 17, pp. 688-690. (1992).

R. Tepe et al. "Viscoelastic Spatial Light Modulator with Active Matrix Addressing," App. Opt. 28, pp. 4826-4834 (1989).

W. Brinker et al. "Metallized Viscoelastic Control Layers for Light-Valve Projection Displays," Displays 16, pp. 13-20 (1995).

S. Sakarya et al. "Technology of Reflective Membranes for Spatial Light Modulators," Sens. and Actuators A 97-98, pp. 468-472 (2002).

R. Tepe "Theoretical Analysis of an Electrically Addressed Viscoelastic Spatial Light Modulator," J. Opt. Soc. Am. A 4, pp. 1273-1282 (1987).

P. Duerr et al. "Characterization of Spatial Light Modulators for Microlithography," Proc. SPIE 4985, pp. 211-221 (2003).

H. Kueck et al. "New system for fast submicron laser direct wrting," Proc. SPIE 2440, pp. 506-514 (1995).

Y. Chen et al. "Modeling and Control of Nanomirrors for EUV Maskless Lithography," Technical Proceddings of the Third Intl. Conf. on Modeling and Simulation of Microsystems, pp. 602-604, 2000.

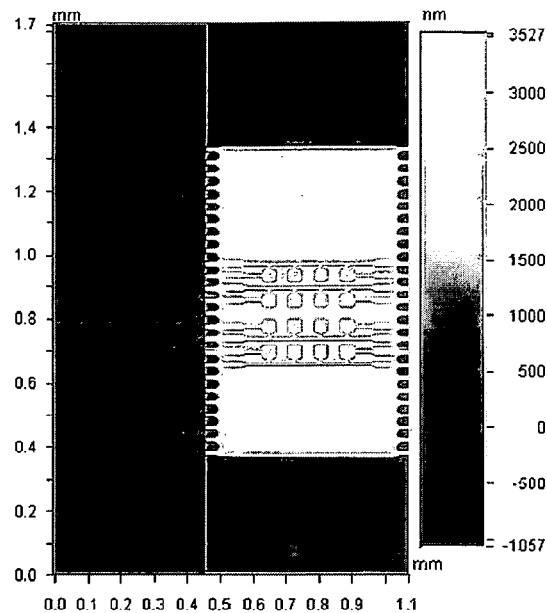
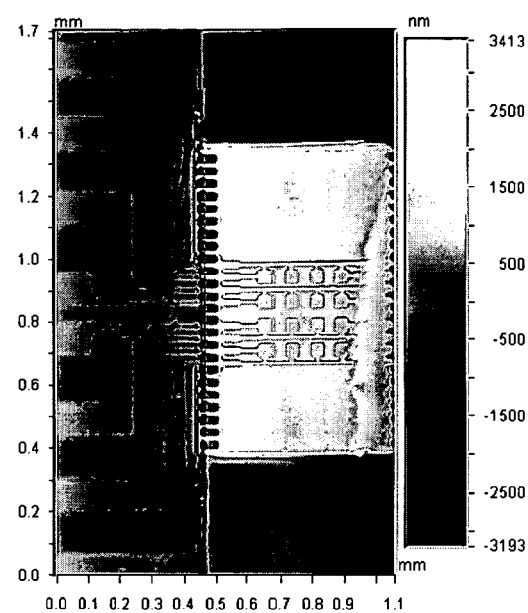
FIG. 6A  FIG. 6B
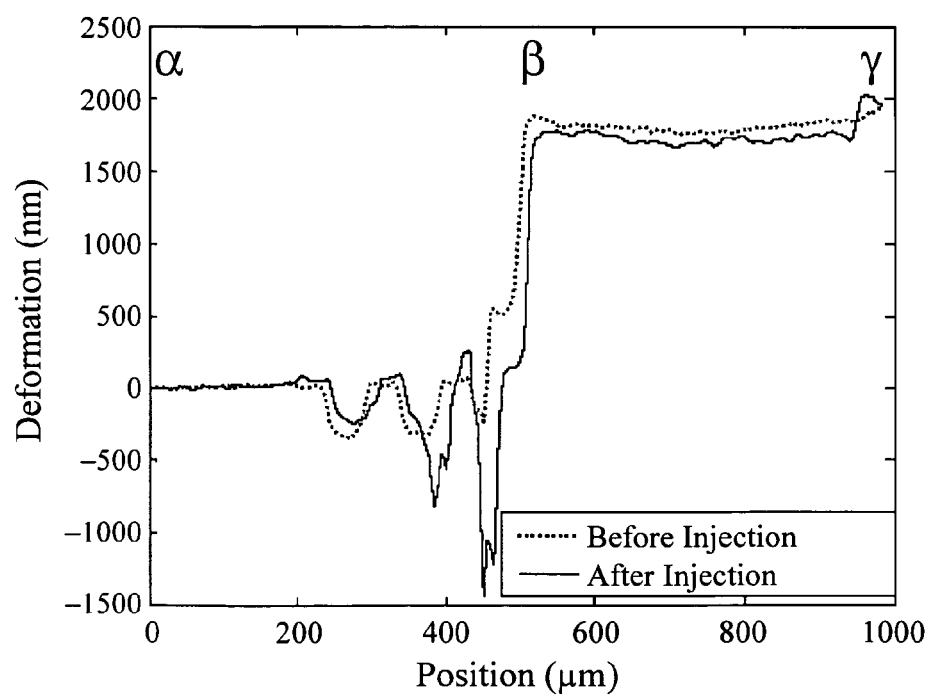
FIG. 7

ELASTOMER SPATIAL LIGHT MODULATORS FOR EXTREME ULTRAVIOLET LITHOGRAPHY

CROSS-REFERENCE TO RELATED APPLICATIONS

This application claims priority from the provisional Patent Application No. 60/510,485, filed Oct. 10, 2003, the entire content of which is incorporated herein by reference.

STATEMENT REGARDING FEDERALLY SPONSORED RESEARCH OR DEVELOPMENT

This invention was supported in part by grant number MDA972-01-1-0021 from the Defense Advanced Research Projects Agency (DARPA). The U.S. Government may have certain rights in the invention.

BACKGROUND OF THE INVENTION

1. Field of the Invention

This invention relates generally to spatial light modulators (SLMs). More particularly, it relates to the design and fabrication of elastomer spatial light modulators for maskless extreme ultraviolet (EUV) lithography.

2. Description of the Related Art

Extreme Ultraviolet (EUV) lithography is considered by pioneering researchers as a leading possibility for delineating structures smaller than 100 nm. Because defect free EUV masks are expensive, difficult to obtain, and cannot be protected by pellicles due to high absorption in the EUV, maskless EUV lithography appears to be a promising alternative. An effort has been made to use spatial light modulators (SLMs) to replace masks, see, N. Choksi et al. "Maskless Extreme Ultraviolet Lithography," J. Vac. Sci. Technol. B 17, pp. 3047–3051 (1999).

EUV lithography, maskless lithography, and SLMs are known in their respective fields and therefore are not further described herein for the sake of brevity. Readers are directed to the following U.S. patents and articles for related teachings in the respective fields.

1. U.S. Pat. No. 4,494,826, "SURFACE DEFORMATION IMAGE DEVICE."
2. U.S. Pat. No. 4,529,620, "METHOD OF MAKING DEFORMABLE LIGHT MODULATOR STRUCTURE."
3. U.S. Pat. No. 4,566,935, "SPATIAL LIGHT MODULATOR AND METHOD."
4. U.S. Pat. No. 5,311,360, "METHOD AND APPARATUS FOR MODULATING A LIGHT BEAM."
5. U.S. Pat. No. 5,867,301, "PHASE MODULATING DEVICE."
6. U.S. Pat. No. 5,870,176, "Maskless lithography."
7. U.S. Pat. No. 6,060,224, "METHOD FOR MASKLESS LITHOGRAPHY."
8. U.S. Pat. No. 6,356,340, "PIEZO PROGRAMMABLE RETICLE FOR EUV LITHOGRAPHY."
9. U.S. Pat. No. 6,544,698, "MASKLESS 2-D AND 3-D PATTERN GENERATION PHOTOLITHOGRAPHY."
10. C. W. Gwyn et al. "Extreme Ultraviolet Lithography,"J. Vac. Sci. Technol. B 16, pp.3142–3149 (1998).
11. Y. Shroff et al. "Fabrication of Parallel-Plate Nanomirror Arrays For Extreme Ultraviolet Maskless Lithography,"J. Vac. Sci. Technol. B 19, pp. 2412–2415 (2001).
12. O. Solgaard et al. "Deformable Grating Optical Modulator," Opt. Lett. 17, pp. 688–690. (1992).
13. R. Tepe et al. "Viscoelastic Spatial Light Modulator with Active Matrix Addressing," App. Opt. 28, pp. 4826–4834 (1989).
14. W. Brinker et al. "Metallized Viscoelastic Control Layers for Light-Valve Projection Displays," Displays 16, pp. 13–20 (1995).
15. S. Sakarya et al. "Technology of Reflective Membranes for Spatial Light Modulators," Sens. and Actuators A 97–98, pp. 468–472 (2002).
16. R. Tepe "Theoretical Analysis of an Electrically Addressed Viscoelastic Spatial Light Modulator," J. Opt. Soc. Am. A 4, pp. 1273–1282 (1987).
17. P. Duerr et al. "Characterization of Spatial Light Modulators for Microlithography," Proc. SPIE 4985, pp. 211–221 (2003).
18. H. Kueck et al. "New system for fast submicron laser direct writing," Proc. SPIE 2440, pp. 506–514 (1995).
19. Y. Chen et al. "Modeling and Control of Nanomirrors for EUV Maskless Lithography," Technical Proceedings of the Third Intl. Conf. on Modeling and Simulation of Microsystems, pp. 602–604, 2000.

Although maskless EUV lithography using SLMs remains a promising approach today, challenges prohibit practical and viable design and fabrication of SLMs for the EUV lithography systems. For example, conventional SLMs fabricated with spin-on deposited elastomer are not suitable for EUV applications because of difficulties in polishing soft materials. They also are not scalable to meet the requirements of existing EUV maskless lithography systems.

Clearly, there is a need in the art for a new design and fabrication of elastomer spatial light modulators that resolves these challenges and provides useful programmable masks for extreme ultraviolet lithography systems. The present invention addresses this need.

BRIEF SUMMARY OF THE INVENTION

The present invention provides a new design and fabrication process for an elastomer spatial light modulator (eSLM) that can be scaled down to a few microns to meet the requirements of EUV maskless lithography. The new eSLM design and fabrication process are compatible with the Mo/Si multilayer deposition for EUV lithography.

According to the invention, an eSLM is fabricated by depositing and patterning a plurality of bottom electrodes on an insulation layer of a substrate. A sacrificial oxide layer is then deposited, patterned and polished on top of the bottom electrodes. A nitride shell forms a protection layer that prevents out-gassing and degradations of elastomer during operations. The sacrificial oxide layer is next removed, forming a cavity. The elastomer is injected at one end of the cavity and pulled into it by capillary forces.

In an embodiment, the eSLM so fabricated comprises a single top electrode and a two-dimensional (2-D) array of elastomer pillars, each of which contains a capacitive actuator with an elastomer as the supporting and dielectric structure. The height of the elastomer pillar can be precisely controlled by the thickness of the sacrificial layer. The maximum process temperature (thermal budget) can be higher than the melting point of elastomers. The single top electrode simplifies the voltage addressing. A stack of Mo/Si multilayer mirror deposited on top of the electrode achieves a reflectivity about 70% or more in EUV.

The innovative design and fabrication process allows the eSLMs to operate as programmable masks for the EUV lithography systems. One skilled in the art will appreciate that variations and modifications of the present invention are possible. For example, any combinations of materials could be used for electrodes, sacrificial layers, protection layers as well as elastomers. Moreover, the number of micromirrors in the SLM could vary depending on needs and/or applications.

The new design and fabrication process disclosed herein advantageously resolves many challenges, in addition to the aforementioned scalability. For instance, the eSLMs design of a single top electrode simplifies the voltage addressing. The nitride shell protects and prevents out-gassing and degradations of elastomer during operations.

Not only the new fabrication process is compatible with the Mo/Si multilayer deposition for EUV lithography, it has many advantages over prior efforts. For example, the height of the elastomer pillar can be precisely controlled by the thickness of the sacrificial layer. The maximum process temperature (i.e., thermal budget) can be higher than the melting point of elastomers. Furthermore, it allows convenient and efficient testing of different elastomers without changing the process.

Other objects and advantages of the present invention will become apparent to one skilled in the art upon reading and understanding the preferred embodiments described below with reference to the following drawings.

BRIEF DESCRIPTION OF THE DRAWINGS

FIGS. 6A–B illustrate the surfaces of a test structure before and after the elastomer injection. The surfaces are measured under a white-light interferometer.

FIG. 7 plots 1-D profiles of FIGS. 6A and 6B, demonstrating that the membrane of the test structure is not adversely affected by the injection. In this example, the membrane is composed of 700 nm nitride and 250 nm polysilicon. The membrane is 200×500 µm, and the electrode is 200×480 µm.

DETAILED DESCRIPTION OF THE INVENTION

Figure 1:
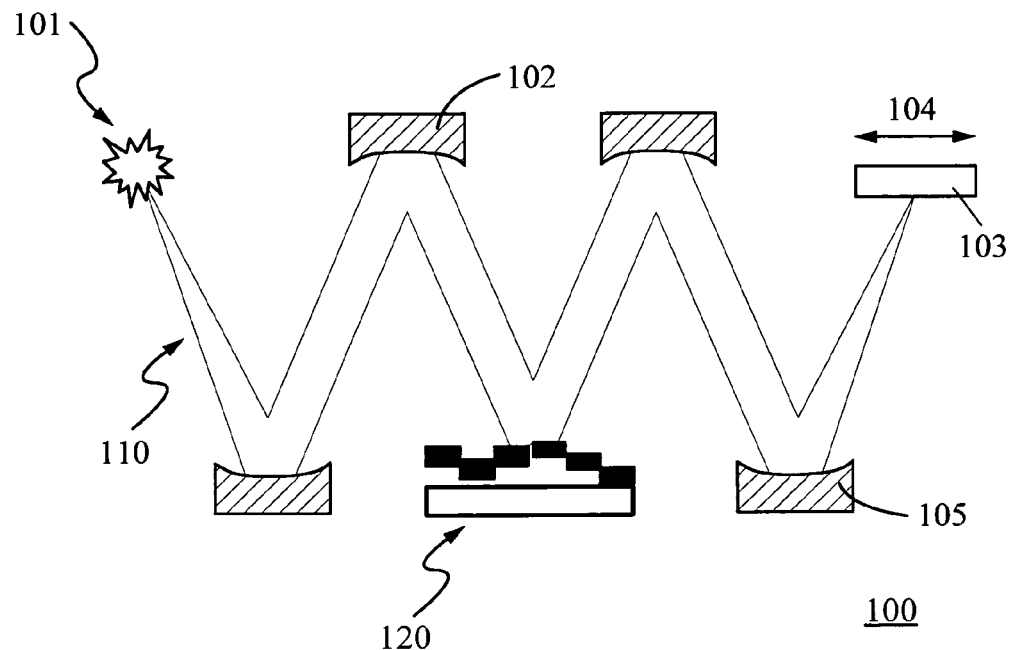
FIG. 1 illustrates the architecture of a maskless EUV lithography system. A collimated EUV beam is modulated by an elastomer spatial light modulator (eSLM), and then focused on the wafer. The pattern on the wafer is varied according to the configuration on the eSLM.

FIG. 1 schematically shows a maskless EUV lithography system 100 comprising an EUV source 101, a plurality of condenser optics 102 and imaging optics 105, a mechanical scanning means 104 positioned over a wafer 103, and a spatial light modulator 120. A collimated EUV beam 110 coming from the EUV light source 101 is modulated by a two-dimensional (2-D) micromirror array of the spatial light modulator 120, and then focused on the wafer 103. The pattern on the wafer 103 is varied according to the configuration on the micromirror array, i.e., the image pattern on the wafer 103 can be controlled electronically. The SLM patterned image only covers a part of the wafer area, so the wafer 103 is mechanically scanned to complete the coverage.

The SLM 120 can be implemented as an array of tilting micromirrors, similar to the digital micromirror device (DMD), but with analog control of the angular deflection. The SLM so implemented controls the intensity of each pixel by tilting the mirror such that the light is reflected outside the aperture of the imaging system.

Figure 2:
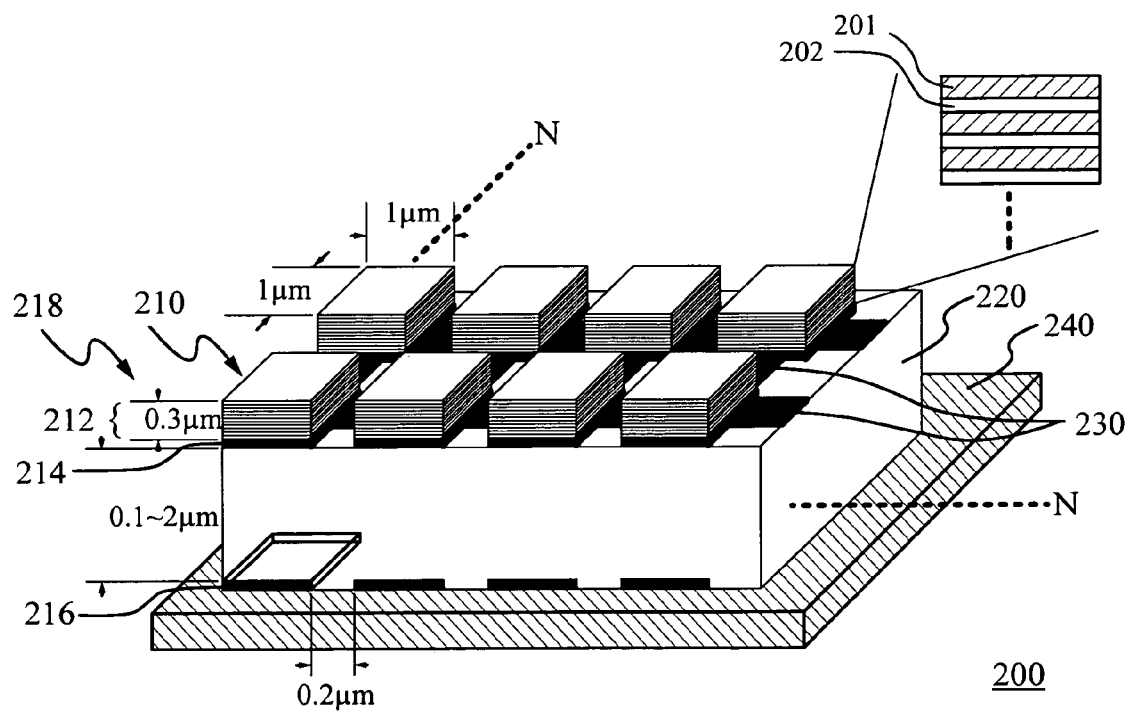
FIG. 2 shows an exemplary structure of the eSLM composed of a two-dimensional (2-D) array of elastomer pillars.

FIG. 2 shows an exemplary elastomer SLM (eSLM) architecture 200 according to the present invention. The eSLM 200 is compatible with the maskless EUV lithography system 100. The eSLM 200 has an N×N array of piston-motion micromirrors and operates on a principle similar to a grating light modulator. The light from a pixel that is phase-shifted by π radians with respect to its surroundings will diffract outside the numerical aperture of the imaging optics and will appear dark in the image pattern. Larger dark areas are created by alternating pixels of 0 and π phase shift. Gray scale is created by analog shifting between 0 and π.

In the exemplary eSLM structure 200 shown in FIG. 2, the phase-shifting mirrors are implemented as elastomer pillars on top of a silicon substrate 240. Each pillar contains a capacitive actuator 218 comprising addressing electrodes 216 and one common top electrode 214 with an elastomer 220 as the supporting and dielectric structure. In an embodiment, a stack 210 of 81 layers 212 of Mo/Si multilayer mirror is deposited on the surface to achieve a reflectivity around 70% in EUV. Each silicon layer 201 of the reflective multilayer 212 is 4 nm thick. Each molybdenum layer 202 is 2.8 nm in thickness. Each reflective multilayer 212 has a dimension of 1 µm×1 µm×0.3 µm and is spaced from one another about 0.2 µm and connected by a layer of interconnect 230.

As one skilled in the art will appreciate, the design and fabrication of SLMs for EUV lithography pose several technological challenges. For example, the optical surfaces must be very smooth and compatible with Mo/Si multilayer technology to achieve high reflectivity. Moreover, since large arrays are desired/required, the fabrication process must allow direct integration with electronics for multiplexing. Finally, the individual pixels must be as small as possible to minimize the need for de-magnifying optics in the EUV.

Figure 3:
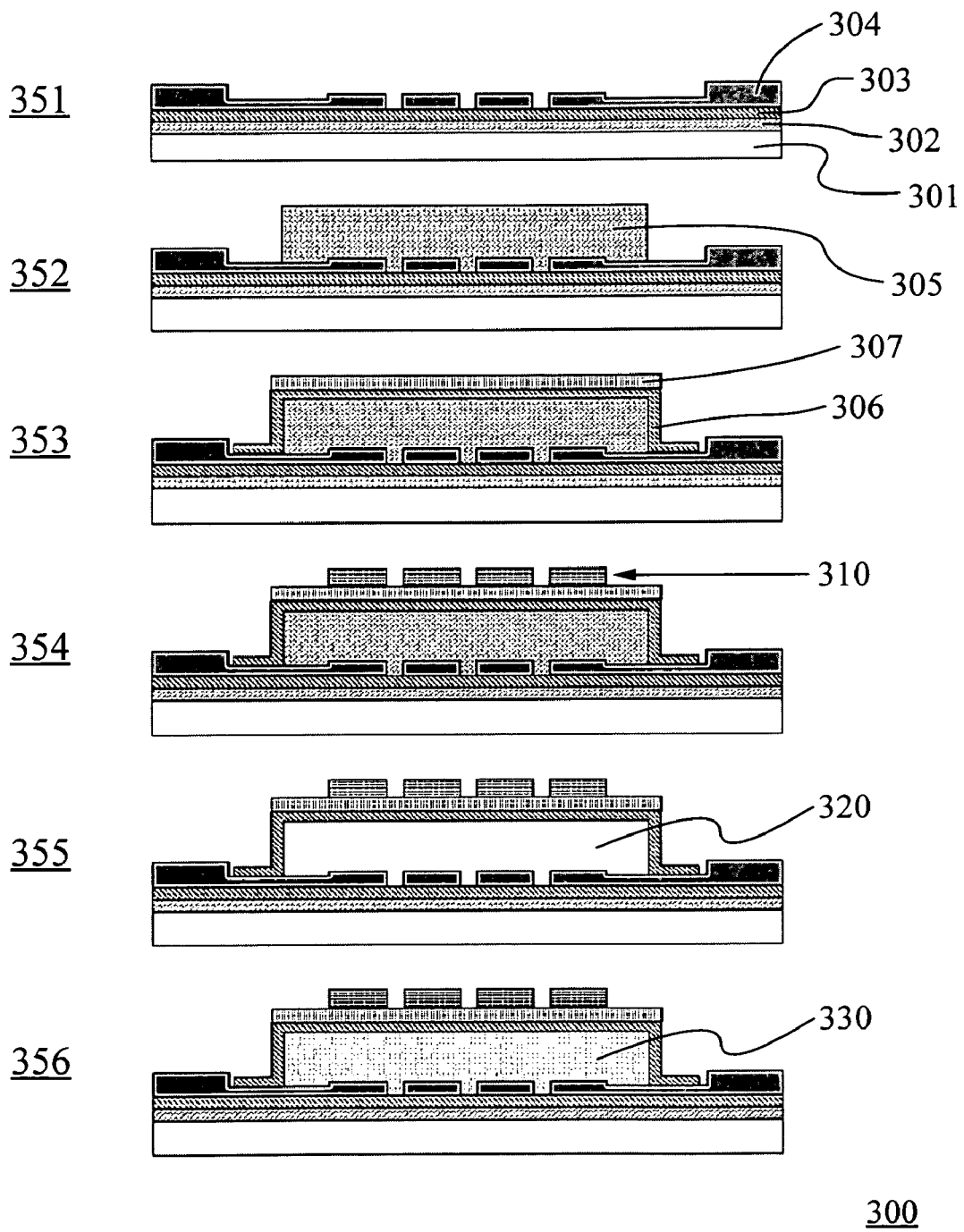
FIG. 3 illustrates the process flow of fabricating the eSLM: The bottom electrodes are deposited on top of an insulation layer. The sacrificial oxide layer is then deposited, patterned and polished. A nitride protection layer and the top electrode are deposited on the flat surface. The mirror material is deposited and patterned, and finally the oxide is released and replaced by the elastomer by capillary forces.

To overcome these challenges, we have developed an eSLM fabrication process 300 as shown in FIG. 3 for producing eSLMs like the eSLM 200 shown in FIG. 2. Referring to FIG. 3, in step 351, bottom (addressing) electrodes 304 are deposited and patterned on an insulation layer of a silicon substrate 301. The insulation layer comprises an oxide layer 302 and a nitride layer 303. In step 352, a sacrificial oxide layer 305 is deposited, patterned, and polished on top of the addressing electrodes 304 to provide a flat surface. In step 353, a nitride shell 306 and a top electrode 307 are deposited and patterned on the flat surface. In step 354, the mirror material 310 for a Mo/Si multilayer is deposited and patterned. In step 355, the sacrificial oxide layer 305 is released, forming a cavity 320. In step 356, the cavity 320 is replaced by an elastomer 330 by capillary forces.

The design of FIG. 2 and fabrication process of FIG. 3 advantageously simplify down scaling to match the size requirements for EUV lithography. For example, only one common top electrode is used to simplify the wire connection and multiplexing. Moreover, because the reflectivity of the Mo/Si multilayer is affected highly by the surface roughness of the substrate, the surface has to be polished in preparation for deposition of the multilayer. As one skilled in the art would know, existing SLM fabrication technology generally utilizes conventional spin-on deposition of the elastomer. However, this technique is not suitable for EUV applications because of the difficulties in polishing soft materials. The eSLM of the present invention is completed by removing the sacrificial oxide layer and replacing it with an elastomer to create the phase-shifting pixels of the eSLM. If desired/required, the top electrode layer and the nitride shell can be pixilated after step 356.

To characterize the mechanical properties of the eSLMs, in the first generation devices, the stack of Mo/Si mirror is replaced by a polysilicon layer with a thickness of 250 nm, roughly equal to the total thickness of the Mo/Si multilayer. The addressing electrodes are a 4 by 4 array of polysilicon squares, each is 20 μm×20 μm. The thickness of the sacrificial oxide and the nitride shell are 2 μm and 0.7 μm, respectively. The elastomer used is the Dow Corning® Sylgard 527 silicone dielectric gel, which has been proven to have repeatable behavior in long-term operations.

After the components of the elastomer are mixed, the preform is de-aired in a vacuum chamber to remove air bubbles and is then injected into the SLM to replace the sacrificial oxide. After the injection, the SLM is heated to 100° C. for an hour to solidify the elastomer.

The eSLM fabrication process according to the present invention allows the formation of very small pixels, limited by the electrode size only. Since the pixels have polished surfaces and the process has few high-temperature steps, the pixels can be vertically integrated with electronics, thereby meeting the requirements of EUV maskless lithography and fulfilling a void in the field.

Another advantage is that, before filling the nitride shell and until the very last step, the process 300 does not involve any elastomer material. This not only circumvents material incompatibilities and contamination, but also allows different elastomers to be tested without changing the process.

Figure 4:
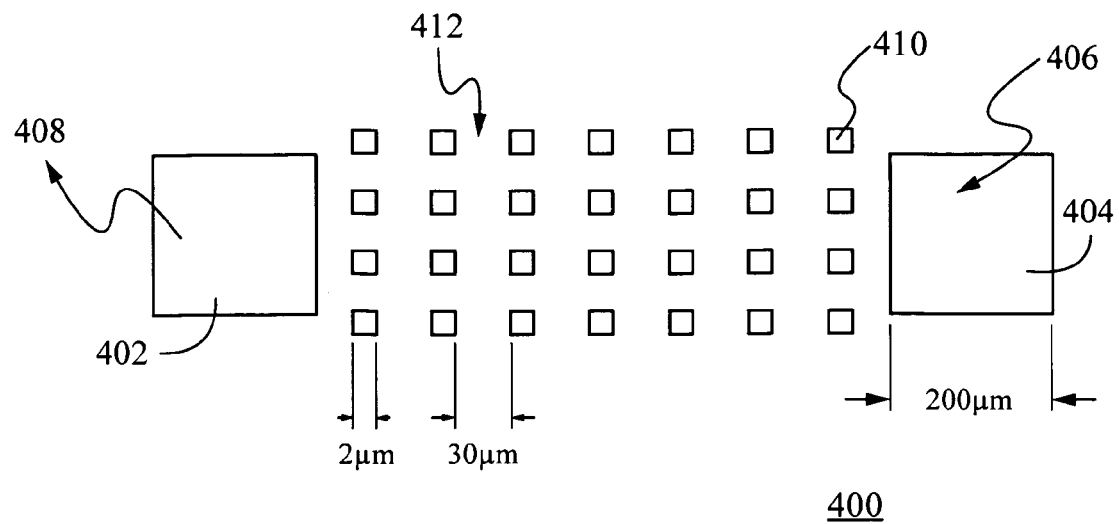
FIG. 4 is a top view (not drawn to scale) of a test structure.

The elastomer replacement is a critical step in the fabrication sequence. A test structure was therefore designed to examine the release and injection processes. FIG. 4 is a top view of a test structure 400, which is not drawn to scale. The test structure 400 is similar to the eSLMs shown in FIGS. 2 and 3, except that the top electrode and multi-layer are not deposited. The reason for removing the reflecting layers is to allow the injection progress to be monitored through the transparent nitride shell.

The test structure 400 has two large square holes 402 and 404, each having a dimension of 200 μm×200 μm. The holes 402 and 404 are etched at two ends of the channel (not shown). The elastomer 406 is injected into one hole 404 and the air 408 inside the channel escapes through the other hole 402. An array of 2 μm by 2 μm etching holes 410 on a 30 μm by 30 μm raster 412 is used to facilitate the oxide release. The length, width, and thickness of the channel are 1000 μm, 400 μm, and 2 μm, respectively.

Figure 5:
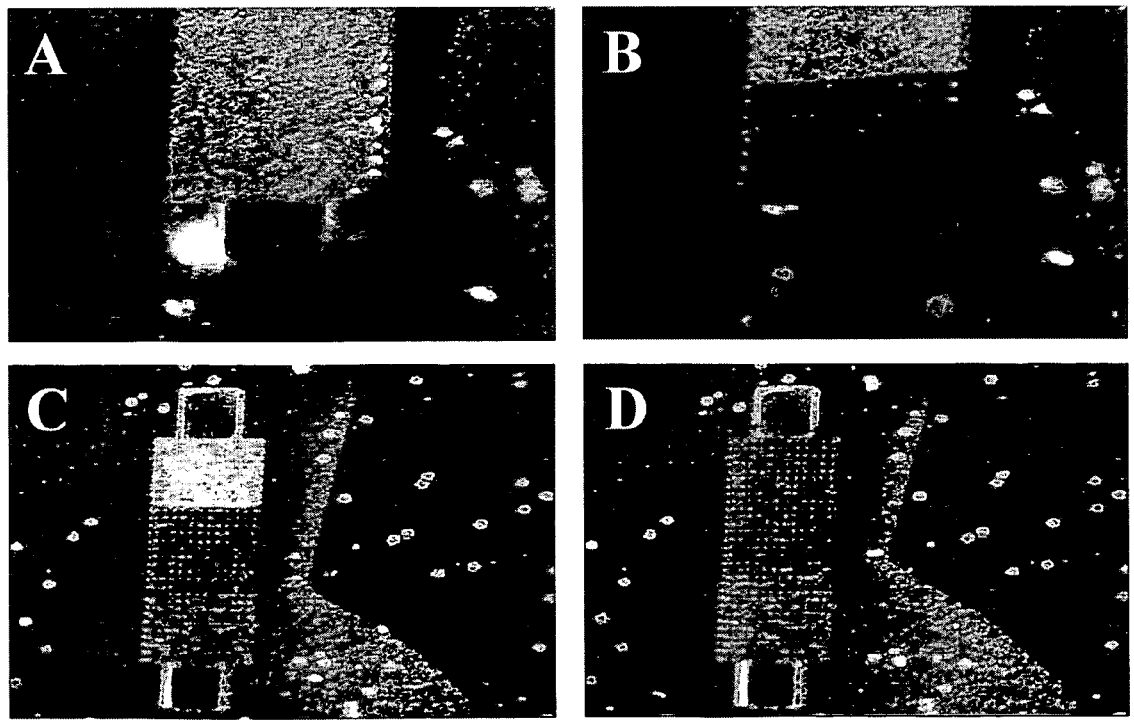
FIG. 5 A-D are photographs showing the injection of elastomer into the test structure of FIG. 4 where the elastomer is pulled into the test structure's cavity by capillary forces.

FIG. 5 consists of four photographs A–D showing the actual process of the elastomer injection in the test structure. The elastomer is injected at one end and pulled into the cavity by capillary forces. The injection test is performed with materials with different viscosities and the results are listed in TABLE 1 below.

TABLE 1

| Material | Viscosity (mPa-Sec) | Injection time |
| --- | --- | --- |
| Dow Corning Sylgard 527 | 450 | ~3 minutes |
| Dow Corning Sylgard 182 | 5000 | ~27 minutes |
| Masterbond Mastersil 773 | 60–70 | <1 minutes |

The injection time is highly related to the viscosity of the material. However, the results show that elastomer injection in shallow channels is possible, even with relatively high viscosity elastomers. Based on the injection results, the Dow Corning® Sylgard 527 dielectric gel was chosen as the preferred elastomer of eSLMs. The surfaces of a SLM structure before and after the elastomer injection are measured under a white-light interferometer and shown in FIGS. 6A and 6B, respectively. As can be seen from FIG. 7, the result shows that the surface profile is not adversely affected by the injection.

Figure 8:
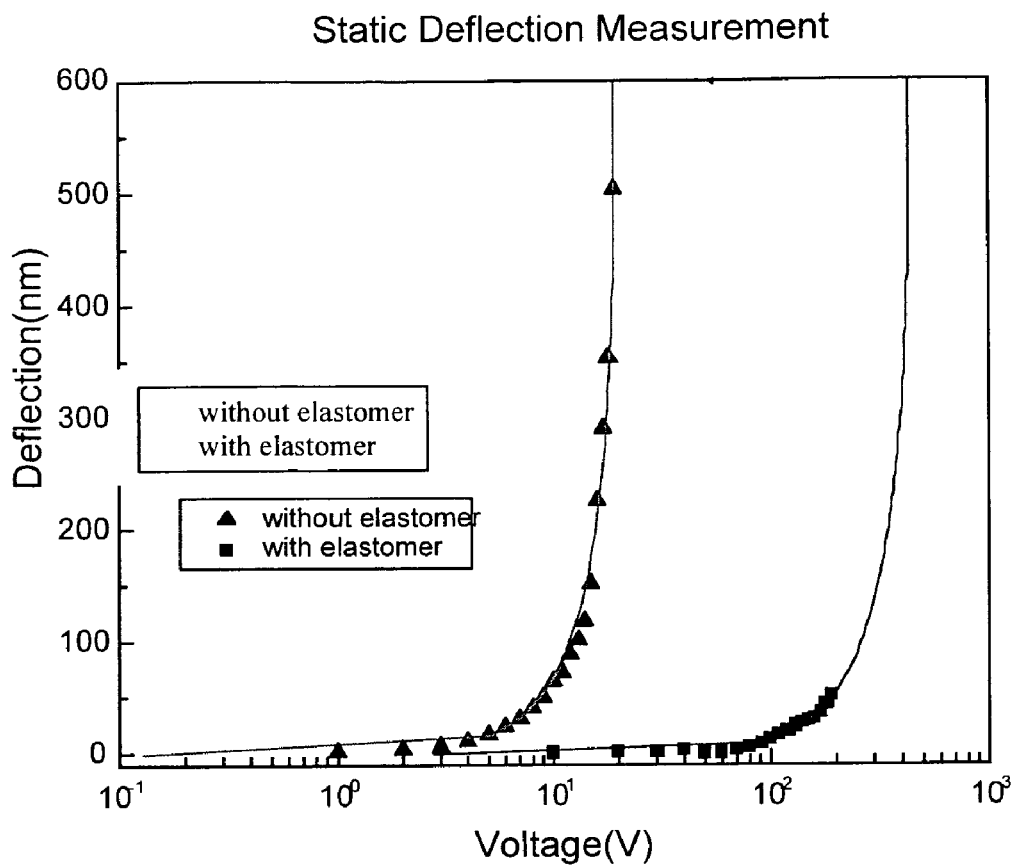
FIG. 8 schematically plots deflection (nm) and voltage (V) for single-electrode SLMs with and without elastomer.

The effects of the elastomer and the nitride shell on the deflection of the SLM actuators were studied using a simple SLM with only a single electrode. The single electrode devices were fabricated on the same wafers with the same process as the 4 by 4 SLMs discussed above, so the thicknesses of each layer are the same. The deflections (at the center) vs. voltages of single-electrode SLMs with and without elastomer are plotted in FIG. 8. The equivalent spring constant increases from 7 N/m to 350 N/m after the elastomer injection, demonstrating that the elastomer provides the majority of the restoring force. The increased stiffness of the structure allows a more precise and localized control of the deflection, as required in EUV lithography systems.

Figure 9:
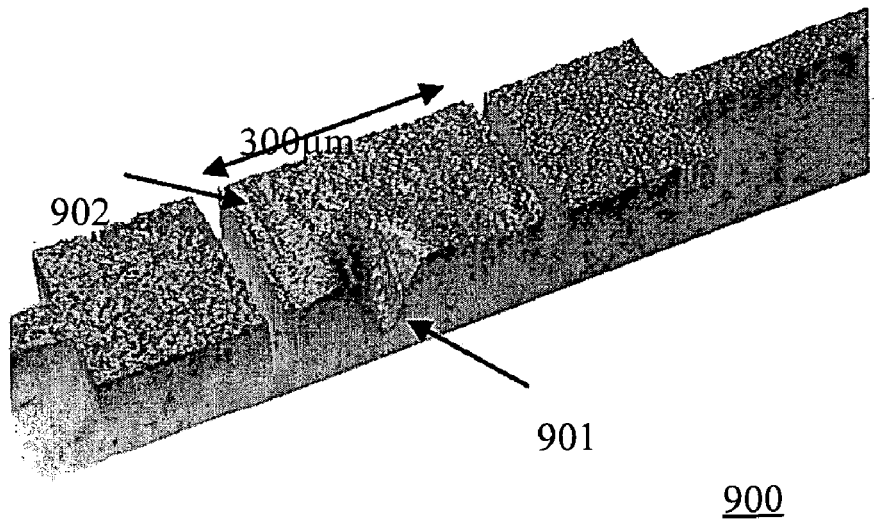
FIG. 9 is a photograph showing the localized surface deformation when one pixel of a 4 by 4 SLM is actuated with 160V DC.

FIG. 9 shows a localized deformation 901 when one pixel of a 4 by 4 eSLM 900 is actuated with 160 volts (V) DC. The surface profiles at 40V to 200V DC with an interval of 40V are shown in FIG. 10.

Figure 10:
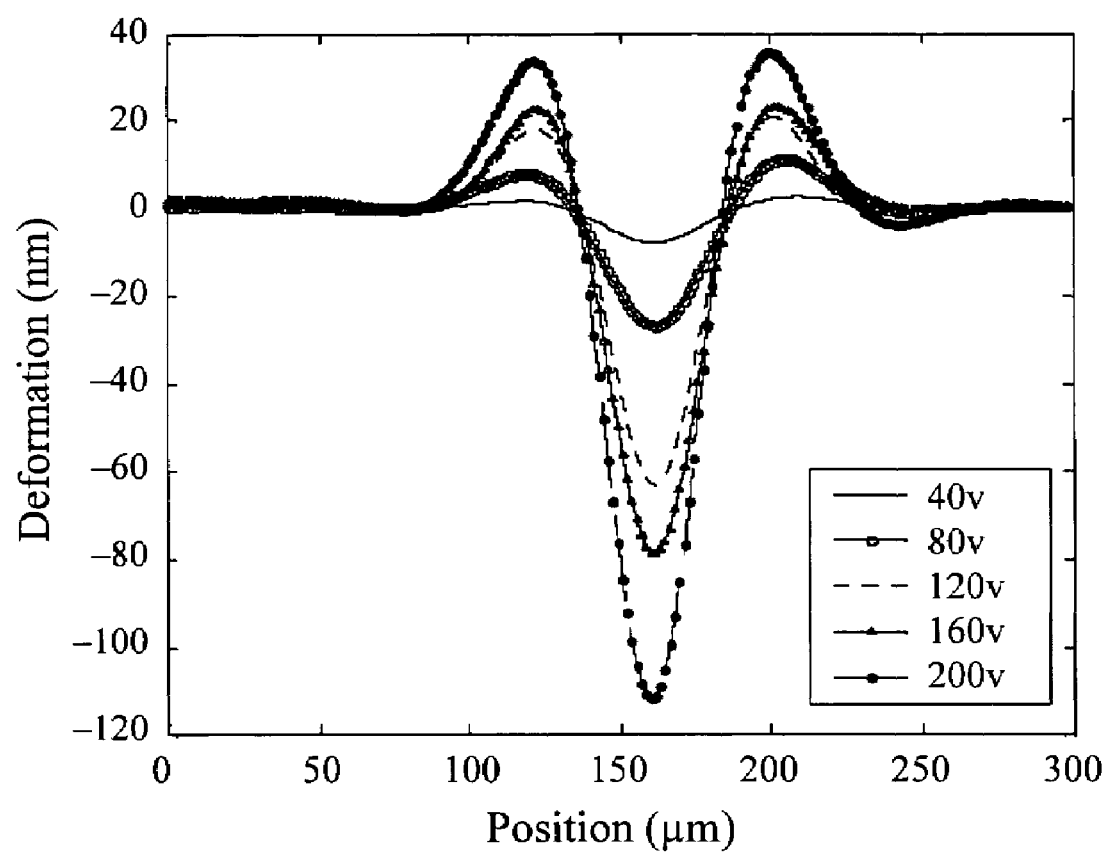
FIG. 10 illustrates the surface profiles of the SLM of FIG. 9 at 40V to 200V DC with an interval of 40V.

As can be seen in FIG. 10, along with a main lobe, two side lobes with significant opposite deflection are evident. The formation of the side lobes is caused by the large ratio of the deformation to the thickness of the elastomer (~6% when the voltage is 200 volts). The area of the deformed region 901, roughly 100 μm by 100 μm, is substantially larger than the pixel size (20 μm by 20 μm). Nonetheless, the result shows that the restoring force provided by the elastomer allows localized deformations of the membrane 902.

The deformed area of SLM is strongly dependent on the thickness of the top membrane. To reduce the area of deformation, the thickness, and therefore the strength, of the membrane must be reduced. This becomes even more important when the pixel size is scaled down to smaller sizes, because the reaction force of the top membrane becomes the dominant factor that limits the deflection of the SLM when the pixels are small. Based on a known analytic model, the deformation amplitude a can be expressed as $$a = \frac{\varepsilon_1}{g} \frac{V_0 V_s \exp(-\pi g d^{-1})}{G_e + \frac{E(\pi h d^{-1})^3}{24(1-v^2)} - \frac{\varepsilon_1}{2}\left(\frac{V_0}{g}\right)^2} \qquad (1)$$

when the applied voltage is $$V(x) = V_0 - V_s \cos\left(\frac{\pi}{d}x\right). \qquad (2)$$

Here h is the thickness of the membrane, and d is the pixel size. E and v are the Young's modulus and the Poisson ratio of the membrane, and $G_e$, $\epsilon_1$, and g are the shear modulus, permittivity, and thickness of the elastomer. For small pixels, the term $E(\pi h d^{-1})^3/24(1-v^2)$, which corresponds to the reaction force of the membrane, dominates the denominator of Eq. (1). The deflection amplitude can then be approximated as:

$$a \approx 24\epsilon_1 V_0 V_s (1-v^2)(gE)^{-1}(\pi h)^{-3} d^3 \exp(-\pi g d^{-1}). \qquad (3)$$

This expression shows that the amplitude depends strongly on the pixel size and the thickness of the membrane. To achieve the required deformation of one-quarter wavelength in the EUV, the thickness of a continuous membrane should be less than 20 nm, assuming the following set of parameters: d=1 μm, $V_0$=200 V, $V_s$=33 V, g=1 μm, $\epsilon_1$=2.7 $\epsilon_0$, $G_e$=10 kPa, E=200 GPa, v=0.4. The thickness of Mo/Si multilayer mirrors used for EUV is on the order of 280 nm. In a practical EUV eSLM with pixel sizes of 1 by 1 μm or less, the Mo/Si layer, as well as the nitride shell and the top electrode, must therefore be pixilated as shown in FIG. 2 to reduce the strength of the top membrane.

Although the present invention and its advantages have been described in detail, it should be understood that the present invention is not limited to or defined by what is shown or described herein. Known methods, systems, or components may be discussed without giving details, so to avoid obscuring the principles of the invention. As it will be appreciated by one of ordinary skill in the art, various changes, substitutions, and alternations could be made or otherwise implemented without departing from the principles of the present invention. For example, the elastomer SLM (eSLM) disclosed herein can be modified to have different number of micromirrors. Moreover, the eSLMs can be readily implemented with a variety of combinations of materials for electrodes, sacrificial layers, protection layers, and elastomers. Skills required for such implementations are known in the art. Accordingly, examples and drawings disclosed herein are for purposes of illustrating a preferred embodiment(s) of the present invention and are not to be construed as limiting the present invention. Rather, the scope of the present invention should be determined by the following claims and their legal equivalents.

What is claimed is:

1. An elastomer spatial light modulator fabrication process comprising the steps of:
   depositing and patterning bottom electrodes on an insulation layer of a substrate;
   depositing a sacrificial layer on top of said bottom electrodes;
   patterning and polishing said sacrificial layer;
   depositing a shell layer on top of said sacrificial layer;
   depositing a single common electrode layer;
   depositing and patterning a reflective layer on top of said electrode layer;
   removing said sacrificial layer to form a cavity; and
   injecting an elastomer into said cavity.

2. The fabrication process according to claim 1, further comprising the step of: patterning said shell layer.

3. The fabrication process according to claim 2, further comprising the step of: pixilating said electrode layer and said shell layer.

4. The fabrication process according to claim 1, further comprising the step of: pixilating said electrode layer.

5. The fabrication process according to claim 1, wherein said substrate is a silicon substrate; and wherein said insulation layer comprises an oxide layer and a nitride layer respectively deposited on top of said substrate.

6. The fabrication process according to claim 5, wherein said sacrificial layer is an oxide layer and said shell layer is a nitride shell.

7. The fabrication process according to claim 1, wherein said reflective layer comprises a plurality of alternating Mo layers and Si layers.

8. The fabrication process according to claim 1, wherein said reflective layer achieves a reflectivity of about 70% or more in extreme ultraviolet (EUV).

9. The fabrication process according to claim 1, wherein said elastomer is pulled into said cavity by capillary forces.

10. An elastomer spatial light modulator made by the fabrication process of claim 1.

11. An extreme ultraviolet lithography system implementing an elastomer spatial light modulator made by the fabrication process of claim 1.

12. An elastomer spatial light modulator comprising:
    a silicon substrate;
    a plurality of bottom electrodes positioned on top of said silicon substrate;
    a single common top electrode;
    a two dimensional array of injection molded elastomer pillars positioned on top of said bottom electrodes and supporting said top electrode, wherein a single elastomer layer between said top electrode and said bottom electrodes includes each of said elastomer pillars; and
    a reflective multilayer deposited on top of said elastomer pillars.

13. The elastomer spatial light modulator according to claim 12, further comprising: a shell layer between said top electrode and said elastomer pillars.

14. The elastomer spatial light modulator according to claim 13, wherein said shell layer, said top electrode, and said reflective multilayer are pixilated.

15. The elastomer spatial light modulator according to claim 12, further comprising: an insulation layer between said bottom electrodes and said silicon substrate.

16. The elastomer spatial light modulator according to claim 12, wherein said top electrode provides interconnection for said elastomer pillars, thereby simplifying wire connection and multiplexing.

17. The elastomer spatial light modulator according to claim 12, wherein said reflective multilayer and said single common top electrode are pixilated.

18. The elastomer spatial light modulator according to claim 12, wherein said reflective multilayer comprises a Mo/Si multilayer.

19. The elastomer spatial light modulator according to claim 18, wherein said reflective Mo/Si multilayer has a dimension of 1 μm×1 μm×0.3 μm.

20. The elastomer spatial light modulator according to claim 18, wherein each elastomer pillar is about 0.1 to 2 μm in height.

21. An extreme ultraviolet lithography system implementing an elastomer spatial light modulator of claim 12, said extreme ultraviolet lithography system comprising:
   an extreme ultraviolet light source; and
   a plurality of condensing and imaging optical elements;
   wherein
   a collimated extreme ultraviolet beam coming from said light source is modulated by said elastomer spatial light modulator and then focused via said optical elements on a wafer, creating an image pattern thereon.

22. The extreme ultraviolet lithography system according to claim 21, wherein said image pattern varies according to a configuration of said elastomer spatial light modulator.

* * * * *